June 23, 1931. R. VON DALLWITZ-WEGNER 1,810,992
METHOD AND MEANS FOR DETERMINING THE VISCOSITY OF LIQUID SUBSTANCES
Filed Dec. 22, 1926
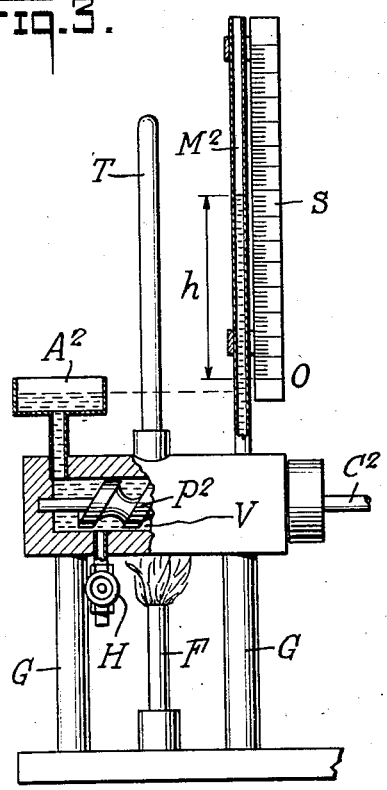
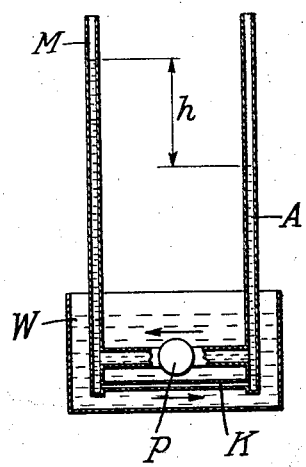
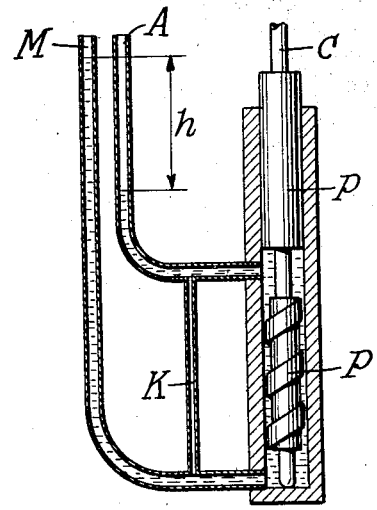
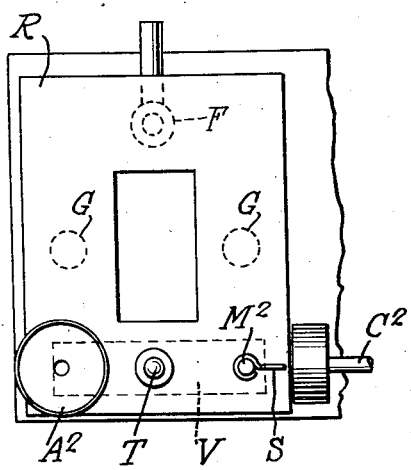
INVENTOR
Richard Von Dallwitz-Wegner
BY
ATTORNEYS Patented June 23, 1931

1,810,992

UNITED STATES PATENT OFFICE

RICHARD VON DALLWITZ-WEGNER, OF HEIDELBERG, GERMANY

METHOD AND MEANS FOR DETERMINING THE VISCOSITY OF LIQUID SUBSTANCES

Application filed December 22, 1926, Serial No. 156,416, and in Germany January 7, 1926.

My invention relates to the art of determining the viscosity of liquid and semi-liquid substances, as e. g. oil, solutions of gum etc. for scientific and technical purposes.

The object of my invention is to provide a new and simple method and efficient means for carrying the same into effect—by which the viscosity of any liquid can be speedily measured and clearly indicated at a high degree of accuracy and dependability.

Other objects and advantages may be recited hereinafter.

The nature and scope of my invention is briefly outlined in the appended claims and will be more fully understood from the following specification taken together with the accompanying drawings in which Fig. 1 diagrammatically shows the principle of my invention.

Fig. 2 shows a viscosimeter designed according to my invention by way of an example.

Figs. 3 and 4 show a structurally modified viscosimeter in side elevation and plan view respectively.

My method of measuring the viscosity of liquids consists in causing a quantity of the liquid under treatment to be filled into two intercommunicating vessels, causing the liquid to be uniformly forced at a comparatively low rate of speed from one of said vessels into the other one and simultaneously causing the transferred liquid to uniformly flow back in a quasi lamelliferous, i. e. non-turbulent stream into its original place, the prevailing hydrostatic pressure indicated by the difference of the respective levels of the liquid in both vessels representing the degree of viscosity.

An apparatus for carrying out my method into practice, shown diagrammatically in Fig. 1 by way of an example, comprises a pair of intercommunicating tubes A and M in the form of a U, a pump P, and a capillary measuring tube K. The pump P is adapted to uniformly force say Q cubic centimeters (ccm.) of the liquid per second into the tube M thereby raising the level of the liquid in said tube M. As the result of its hydrostatic pressure the transferred liquid will flow back thro the capillary tube K into the tube A. By controlling the volumetric effect of the pumping action a state of equilibrium can be obtained in which at a certain difference of the levels of the liquid in both tubes—equal say to $h$ centimeter (cm.)—the quantity of liquid transferred by the pump—equal to Q cm./sec.—equals that flowing back thro the capillary tube.

If of the capillary measuring tube K the radius is equal to R cm., its length L cm. and $\gamma$ the density (specific gravity) of the liquid, the absolute viscosity of the latter is according to the law of Poisseuille $$\eta = \gamma h \frac{(\pi 981 R^4)}{8LQ} = \gamma h C \text{ absolute units}$$

By making or adjusting a viscosimeter so as to have an individual constant C equal to a round number—say C=0,1—the instrument—$h$ being equal to 0,1 cm.—would indicate the absolute viscosity $\eta=0,01$, or if called for Engler degrees ($\gamma=1$) the viscosity would be $\eta=1$.

Taking into account the density of any given liquid, its viscosity can be measured in a simple manner by means of a millimeter scale attached to the tube M of the instrument, the viscosity degree being a multiple figure of the viscosity 0,01.

The scale for reading the viscosity may be gauged so as to indicate directly Engler-degrees Saybolt-degrees, Redwood-degrees etc., in which cases the density of the liquid needs not to be considered.

W is a trough containing a heating medium by which the liquid within the whole instrument can be uniformly heated to the most appropriate temperature for taking measurements.

By this new method the viscosity of a liquid can be speedily measured by directly reading the latter on a scale, and it has another advantage which lies in the fact that only a very small quantity of the liquid is required for the measuring operation—in most cases not more than 30 ccm.

It should also be noted that the accuracy of the measuring operation is greatly enhanced by the fact that the liquid at P and K is in exactly the same condition.

A structurally modified viscosimeter for carrying out the above method is diagrammatically shown in Fig. 2. The pump is made in form of a rotary shaft P being adapted at C to be driven e. g. by a clock work—not shown—at a comparatively low rate of speed and being provided with a rather flat screw-threading.

By the pump P the liquid is forced from tube A into tube M, flowing back thro the capillary tube K conformably to the difference of hydrostatic pressures.

Means for heating the instrument—not shown—are provided as in the case of Fig. 1.

Another structurally modified instrument for carrying my invention into practice, shown in Figs. 3 and 4 in side elevation and plan view respectively, comprises a solid metal frame R, supported by posts G from a base plate. The front part of the frame R is provided with a bore hole V, representing the working chamber of a screw shaped rotary pump P2 and being in communication with a funnel shaped tube A2 and an indicating tube M2, the latter having a comparatively small diameter.

It will be noted that the helical groove representing the screw threads of the pump P2 are much deeper than with the rather flat screw shown in Fig. 2.

A rotary shaft C2 cooperatively connecting the pump with a source of power, e. g. a clockwork—not shown—is provided for setting the instrument into operation.

A burner F, being in true symmetrical disposition underneath the frame R, serves for uniformly heating the liquid within the bore V, a thermometer T being provided for controlling the heating effect. The frame R may be rectangular with a central opening X so that the heat from the burner is uniformly distributed along opposite sides of the frame to the portion of the frame having the bore V, whereby the latter is uniformly heated throughout its length.

After the liquid has been filled into the instrument thro the funnel A2 the level of the liquid in the tube M2 by reason of its capillary raising effect will be slightly higher than in the funnel A2.

The scale S is then clamped to the tube M2 and adjusted so as to bring its zero point O into proper register with the liquid level in the tube, referred to above.

On setting the pump into action the liquid is forced into the tube M2 and the viscosity—represented by the difference $h$—can then be directly read on the scale S in absolute units, or in Engler-, Saybolt-, Redwood- etc. degrees according to the respective gauging of the scale.

It will be noted that the instrument shown in Figs. 3 and 4 has no capillary tube for the redelivery of the liquid. Experiments have shown that an auxiliary tube for this purpose is not needed, if the pump is rotated at low speed—e. g. 100 revolutions per minute—and if its screw-threading is of comparatively great depth. Under these conditions a quasi lamellary i. e. non-turbulent stream of the liquid will flow backwards along the bottom of the screw threads into tube A2 while only the outermost sections of the threads appear to propel the liquid in the direction to the tube M2.

Also in this case the Poisseuille equation will hold good its validity and dependability being confirmed.

After the measuring operation the liquid can be drawn off thro the discharge valve H.

Various changes may be made in the construction of viscosimeters working according to the above outlined method, without substantially departing from the spirit and the leading ideas of my invention.

What I claim is:

1. The method of measuring the viscosity of liquids which consists in causing the liquid to be forced at a comparatively low and uniform rate into a vessel while permitting return slippage through an open passage of fixed cross sectional area, whereby the viscosity is determined by the level to which the liquid is raised in said vessel.

2. A viscosimeter, including a pair of intercommunicating vessels, a rotary pump arranged intermediate of said vessels and adapted for forcing the liquid from one vessel into the other and a permanently open passage of fixed cross sectional area through which non-turbulent return slippage may take place.

3. A viscosimeter, including a pair of intercommunicating vessels, a screw conveyor arranged intermediate of said vessels for transferring liquid from one vessel to the other, the threads of the screw being comparatively deep so as to permit non-turbulent return slippage at a rate dependent upon the viscosity of the liquid.

4. A viscosimeter, including two intercommunicating vessels, one in the form of a comparatively wide funnel and the other in the form of a transparent ascending tube provided with a scale, and means for delivering liquid from the first mentioned vessel to the second mentioned vessel and at the same time permitting return slippage.

5. The method of measuring the viscosity of a liquid, which includes rotating a screw at comparatively low speed to deliver the liquid axially of the screw from a source of supply to the lower end of an upright gauge tube, and permitting non-turbulent return flow of said source through a passage of fixed cross-sectional area, whereby the level in the gauge tube indicates the degree of viscosity and the pressure of the liquid in the tube as determined by its level is in direct linear relationship to the viscosity.

6. The method of measuring the viscosity of a liquid, which includes rotating a screw at comparatively low speed to deliver the liquid axially of the screw from a source of supply to the lower end of an upright gauge tube, and permitting non-turbulent return flow of said source through a passage, whereby the level in the gauge tube indicates the degree of viscosity and the pressure of the liquid in the tube as determined by its level is in direct linear relationship to the viscosity.

7. A viscosimeter including two intercommunicating vessels, one serving as a supply vessel and the other as a receiving vessel, the latter being in the form of an ascending transparent tube, a screw conveyor arranged intermediate of said vessels for transferring liquid from the supply vessel to said tube, and means permitting a non-turbulent return slippage at a rate dependent upon the viscosity of the liquid.

In testimony whereof I have signed my name to this specification.

Dr. RICHARD v. DALLWITZ-WEGNER.